United States Patent [19]

Bock et al.

[11] 4,370,270

[45] Jan. 25, 1983

[54] NOVEL PIGMENTARY FORM OF β-COPPER PHTHALOCYANINE

[75] Inventors: Gustav Bock, Neustadt; Wolfgang Fabian, Wilhelmsfeld, both of Fed. Rep. of Germany

[73] Assignee: BASF Aktiengesellschaft, Rheinland-Pfalz, Fed. Rep. of Germany

[21] Appl. No.: 274,423

[22] Filed: Jun. 17, 1981

[30] Foreign Application Priority Data

Jun. 25, 1980 [DE] Fed. Rep. of Germany ...... 3023722

[51] Int. Cl.³ .............................................. C09B 47/04
[52] U.S. Cl. .................................................. 260/245.87
[58] Field of Search ...................... 260/314.5, 245.87

[56] References Cited

U.S. PATENT DOCUMENTS

| 2,999,862 | 9/1961 | Geiger | 260/314.5 |
| 3,593,927 | 7/1971 | Neill | 260/314.5 X |
| 3,775,149 | 11/1973 | Langley et al. | 260/314.5 X |
| 3,944,564 | 3/1976 | Hanke | 260/314.5 |
| 3,954,794 | 5/1976 | Jackson | 260/314.5 |

OTHER PUBLICATIONS

Moser et al., Phthacyanine Compounds, Reinhold Publishing Corp., New York, (1963), pp. 23-26.

Primary Examiner—Richard Raymond
Attorney, Agent, or Firm—Oblon, Fisher, Spivak, McClelland & Maier

[57] ABSTRACT

A β-copper phthalocyanine pigment which consists, to the extent of more than 50% by weight, of flakes which are not less than 10 μm long and 3 μm wide, the length:-width ratio being not less than 3.3:1, and which has a reflection maximum between 610 and 640 nm and another between 710 and 740 nm.

In surface coatings and printing inks the pigment gives optical effects resembling those of metallic pigments. In a baking finish, reddish brown to bluish gray colorations with a metallic reflectance are obtained.

2 Claims, 1 Drawing Figure

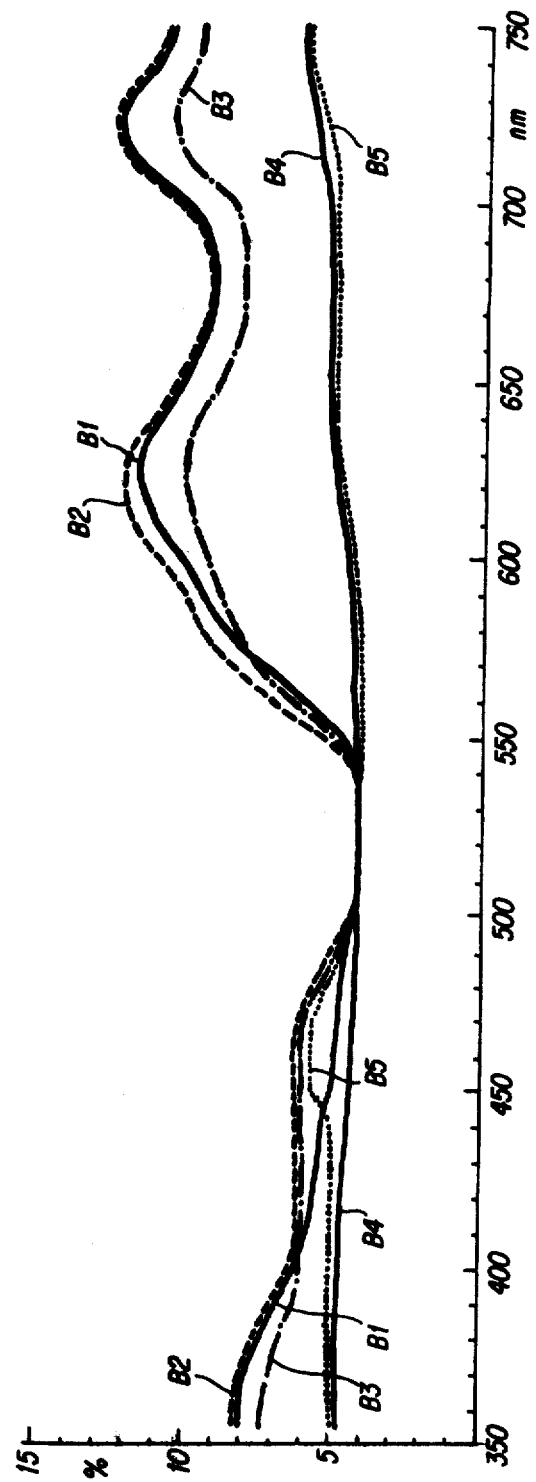

NOVEL PIGMENTARY FORM OF β-COPPER PHTHALOCYANINE

The present invention relates to a novel pigmentary form of β-copper phthalocyanine.

In this novel pigmentary form of β-copper phthalocyanine (CuPc), the pigment consists, to the extent of at least 50% by weight, preferably to the extent of 70% by weight or more, of flakes which are not less than 10 μm long and not less than 3 μm wide, the length:width ratio being not less than 3.3:1 and has a reflection maximum between 610 and 640 nm and another between 710 and 740 nm.

Printing inks and surface coatings of the novel pigmentary form give optical effects which resemble those of metallic pigments. For example, when it is used in a baking finish, a high-hiding coating is obtained which shows a reddish brown or bluish gray metallic luster, depending on the angle of incidence of the light.

Surface coatings produced with the novel CuPc pigments of the present invention differ significantly, in the reflectance curve of the visible region of the spectrum, namely at from 350 to 750 nm, from coatings produced with CuPc pigments of the prior art.

The reflectance curves of high-hiding pure shade colorations employing conventional CuPc pigments are virtually straight lines which run parallel to the abscissa, ie. virtually all the incident light is absorbed. Only 4–6% of the light is reflected. Accordingly, the viewer has the impression of a dark, blue color. The blue impression is due to a flat reflection maximum at 460 nm. This maximum is about 2% above the basic reflection of 4%. At the end of the visible region, at 710–750 nm, the reflection again rises slowly to about 6% at 750 nm.

In contrast, the novel CuPc pigments show a marked reflectance above 550 nm. This reaches a maximum at between 610 and 640 nm, the maximum being 5–7% above the reflection curve of the conventional CuPc pigments. A second reflection maximum, of the same height, is found in the region between 710 and 740 nm, (FIG. 1, appendix). Accordingly, the colorimetric evaluation of the reflectance curves, in accordance with DIN 6174, of surface coatings containing the novel CuPc pigments, in terms of the three characteristics required to establish the color location, namely lightness (L), hue gradation (HGD) and chroma (C) (=purity of hue), reveals novel hues.

The lightness L is $\geq 25$ and accordingly significantly above the value of the prior art CuPc pigments, where L is $\leq 20$.

The hue gradation HGD has values of from 15 to 33, indicating the reddish hues (blue color locations have an HGD of about 270, the purple range corresponds to HGD's of from 270 to 360, and red starts at HGD zero). The conventional brownish dark CuPc pigments have an HGD of $\leq 10$, whilst the bluish dark CuPc pigments fall in the purple range, with an HGD of about 320.

The purity of hue (chroma) of the novel CuPc pigments is also superior to those of the prior art pigments. For the former, C is $\geq 15$ and accordingly substantially above the values for the prior art CuPc pigments, where C is at most 10.

By varying the reaction conditions, it is possible to obtain pigmentary forms which, in the surface coating, give luminous golden brown to dark brown, or luminous reddish brown to yellowish brown, metallic effects. These results are surprising. It is known to a skilled worker that using the conventional β-CuPc, which consists of acicular particles which are from 1 to 20 μm in length, only tinctorially worthless dull, almost black colorations are obtained. The valuable blue pigmentary forms are obtained from these raw pigments only by comminuting the particles and conditioning them by a finishing method.

It is surprising that increasing the crystals of CuPc to above 10 μm gives pigmentary forms which produce metallic effects. A skilled worker would have expected, from his knowledge, that increasing the size of the crystals would give tinctorially worthless pigmentary forms of low color strength.

The novel pigmentary form can contain 10% by weight, or more, of flakes of from 100 to about 150 μm length. The third dimension, namely the thickness, of the novel pigmentary form is low, being about 1 μm.

The width of the flakes is from 33 to 100% of the length, pigments with a length:width ratio of from 1:033 to 1:0.6 occurring most frequently.

According to the result of other conventional methods of characterizing pigments, such as elementary analysis, X-ray diffraction and infrared spectrum, the product is a CuPc in the β-modification.

The novel pigmentary form has a bulk density of $\leq 300$ g/l, in particular of $\leq 200$ g/l.

The novel CuPc pigment is obtained direct from the method of synthesis. In the latter, a finely divided copper powder is reacted with o-phthalodinitrile in nitrobenzene in the presence of ammonia and of molybdic acid anhydride (molybdenum oxide) as the catalyst.

In order to obtain the pigmentary form according to the invention, the starting materials must conform to the criteria given below, and the reaction conditions stipulated below must be observed.

The copper powder used must be sufficiently fine to pass an 0.1 mm mesh screen without any retention. Furthermore, more than 98% by weight of the powder must consist of copper.

The most important condition, however, is that the o-phthalodinitrile used is sufficiently pure. It must be soluble, without residue, in aromatic solvents, such as xylene, chlorobenzene or nitrobenzene, and must not contain more than 1.5, and preferably not more than 1, % by weight of its isomers, namely terephthalodinitrile and/or isophthalodinitrile, and/or of other nitriles, such as tolunitrile. The purer the o-phthalodinitrile used, the more easily is the novel pigmentary form of CuPc obtained. Thus, o-phthalodinitrile of purity $\geq 99.9\%$ by weight gives a flaky CuPc pigment which contains more than 80% by weight of particles of $\geq 20$ μm in length. In contrast, an o-phthalodinitrile which contains from 2 to 4% by weight of isomeric dinitriles and/or other nitriles gives a CuPc which in addition to flakes of less than 10 μm length contains substantial proportions of acicular β-CuPc crystals. If the o-phthalodinitrile contains more than 4% by weight of isomeric dinitriles and/or other nitriles, the β-CuPc produced is essentially all in the (known) acicular form.

The purity of the other materials required to prepare the pigment is not so critical. The commercial technical-grade products are sufficiently pure.

The ratio of o-phthalodinitrile to solvent is as a rule from 1:2.5 to 1:10, preferably about 1:3.5 to 1:6.0, by weight.

The amount of copper powder used is not more than the stoichiometrically required amount, ie. 0.25 equivalent per mole of o-phthalodinitrile. Preferably, however, excess phthalodinitrile is used, so that the product ultimately isolated is free from copper powder. As a rule, therefore, up to 10%, preferably 2-6%, excess of dinitrile is employed.

The amount of molybdic acid anhydride is from 0.001 to 0.15, preferably from 0.01 to 0.1, % by weight, based on o-phthalodinitrile, and is accordingly less than the amount of molybdic acid anhydride conventionally used in the preparation of CuPc from o-phthalodinitrile.

To prepare the novel pigmentary form, the mixture of o-phthalodinitrile and copper powder with solvent, preferably nitrobenzene, is saturated with ammonia at from 70° to 100° C. and then heated to 180°-210° C., preferably to 145°-205° C., and the molybdic acid anhydride required as a catalyst is only added 30-60 minutes after the reaction temperature has been reached. Excessively vigorous stirring during the reaction should be avoided. The reaction mixture is only stirred just sufficiently to prevent the copper powder from settling out. During the reaction, all measures which form numerous crystal nuclei and accordingly favor the formation of acicular $\beta$-CuPc should be avoided. For the same reason, the reaction mixture should also not contain a reaction accelerator, such as a copper-I salt or ammonium salt.

The reaction is carried out under such conditions that the exothermic formation of CuPc extends over a lengthy period. For example, at 200° C. a reaction time of from 4 to 20 hours has proved advantageous. After 4 hours, the novel pigmentary form is already present, but the yield is occasionally only about 80% of theory. A yield above 90% by theory is reliably achieved after 16-20 hours at 200° C.

The shape, size and particle size distribution can be influenced to a certain degree, during the reaction, by varying the temperature, adding small amounts of a lower alcohol, preferably methanol, whilst heating-up the reaction mixture, and/or varying the amount of molybdic acid anhydride used. By these measures, it is possible to obtain pigmentary forms exhibiting different shades in paints and printing inks. Thus, it is possible to prepare pigmentary forms which in surface coatings give luminous golden brown to dark brown effects or luminous reddish brown to yellowish brown effects.

The largest flakes, having edge lengths of about 100 $\mu$m and an almost square shape (length:width ratio=-from 1:1 to 1:0.6) are obtained, under the above optimum conditions, after a reaction time of about 4 hours. These flakes give surface coatings exhibiting golden brown metallic effects. The powder as such has a reddish glitter. On using higher concentrations of the reactants in the reaction mixture, increasing the rate of stirring or adding larger amounts of molybdic acid anhydride, crystal growth is reduced. The addition of small amounts of a lower alcohol, preferably methanol, to the reaction mixture during heating-up also influences the shape of the flakes, even though the alcohol distills off again before the actual reaction starts. In the surface coatings, the golden hue and metallic effect progressively disappear, and the hue shifts to reddish violet.

If the reaction is carried out in the presence of accelerators, such as copper-I salts, or is carried out with insufficiently pure o-phthalodinitrile, needles having a width of about 1 $\mu$m or less are obtained under the conditions stated above. This CuPc gives dull brownish blue to dark blue surface coatings. Evidently, the light is no longer subjected to mirror-like reflection if the particle width decreases below a critical value of about 1 $\mu$m.

The conventional acicular CuPc products do not give metallic effects even if the 1 $\mu$m wide needles have lengths of up to 100 $\mu$m.

After completion of the reaction, the pigment is isolated in a conventional manner. The flaky product is very easy to filter off, and the mother liquor can easily be completely removed from the pigment by washing. To remove the high-boiling solvent, the filter residue is washed with a low-boiling solvent, such as methanol, ethanol, acetone or the like, and is then dried gently.

The CuPc obtained by the process is very pure. The flaky CuPc can, after comminution, also be converted to conventional finely divided pigmentary forms by means of the usual finishing methods.

The Examples which follow illustrate the invention. Percentages are by weight.

DETERMINATION OF PARTICLE SIZE DISTRIBUTION

The distribution of the particle sizes in the CuPc pigments obtained was determined by 2 methods:
(1) by wet sieving and
(2) by the diffraction counting process.

Process (1) is very time-consuming and labor-intensive. The diffraction counting process is rapid but has the disadvantage that it only copes with the range of from 2 to 170 $\mu$m and accordingly the weight of particles of <2 $\mu$m and >170 $\mu$m is not taken into account. Nevertheless, the two methods gave distribution curves which agreed very well.

The measured size distribution of the samples is shown in Table 1 (wet sieve analysis) and 2 (diffraction counting).

EXAMPLE 1

(a) 108 g of isomer-free o-phthalodinitrile (99.8% pure according to gas chromatography), 12.6 g of finely divided copper powder (from Schlenk) and 400 g of nitrobenzene are introduced into a 1 liter three-neck flask fitted with a thermometer, paddle stirrer, reflux condenser and a short gas inlet tube which does not dip into the liquid. A slight stream of ammonia, at the rate of 1-2 bubbles per second, is introduced, via a glycol-filled washbottle, into the apparatus, whilst stirring the mixture, and the air is thus displaced. The reflux condenser is connected to a second glycol-filled washbottle, so that the apparatus is sealed from the atmosphere and air cannot enter. After the air has been displaced, the mixture is saturated with ammonia at 70°-100° C. whilst stirring at 250 rpm, and is then gradually and uniformly heated to 200° C. internal temperature in the course of 3 hours, and kept at this temperature for 30 minutes. 50 mg of molybdic acid anhydride are then added and the mixture is stirred at 200° C. After about 3 hours, a thick reaction mixture has formed, which is only just stirrable and shows a reddish bronze effect in light. The mixture is kept at 200° C. for a total of 5 hours after addition of the molybdic acid anhydride. The reaction mixture is then cooled to 150° C. and filtered on a coarse glass suction filter, and the filter residue is washed with nitrobenzene until the filtrate is pale, and thereafter with methanol until free from nitrobenzene. The filter cake thus obtained is dried at 70° C. 107 g of copper phthalocyanine, in the $\beta$-modification, are obtained in the form of a glistening loose powder with a reddish sheen, having a bulk density of 200 g/l. The product can be used direct for the production of metallic effect finishes.

| $C_{32}H_{16}N_8Cu$ (molecular weight 575.5) | | | | |
|---|---|---|---|---|
| | C | H | N | Cu |
| calculated | 66.8 | 2.78 | 19.5 | 11.04% |
| found | 66.2 | 3.0 | 18.9 | 11.2% |

A sample of about 1 mg is triturated with one drop of linseed oil on a microscope slide and a cover slip is placed on top; under the microscope, at 100-fold magnification, the crystals show up as coarse flakes, some of which are almost square in appearance. The proportion of particles of $\leq 10$ μm is very low.

More than half of the particles are more than 50 μm long and about 10-40 μm wide. If the incident light is allowed to impinge at an angle, a brownish glitter or sheen is discerned, and the peculiar structure of the flakes, interlocked at the edges, is noted.

The particle size distribution is determined on a sample of the CuPc pigment both by wet sieve analysis and by diffraction counting. The results are summarized in Tables 1 and 2. More than 90% of the particles are larger than 20 μm.

(b) 8 g of the pigment obtained according to (a) are dispersed in 92 g of an alkyd-melamine baking finish ($\triangleq 35\%$ solids) by stirring, using a dissolver. The colored finish thus obtained is sprayed onto an aluminum sheet or bonderized steel sheet until the substrate has been covered. After air-drying for 15 minutes, the coating is oversprayed with a clear acrylate-melamine baking finish (about 35% solids content) and the coating is air-dried for 30 minutes and then baked at 130° C. for 30 minutes. A very glossy coating, whose character resembles a metallic effect, is obtained. Depending on the angle of incidence of light, the viewer sees luminous golden brown to bluish gray or brown colors having a marked yellowish cast.

The reflectance curve of the coating, recorded with visible light, of standard light type D, in the range of from 350 to 750 nm (Spectronic 505; Bausch & Lomb, Rochester, N.Y.) shows, from about 570 nm onward, a reflectance of from 7 to 12%, with two slight maxima at 630 and 720 nm (cf. curve B1 in the Figure).

The colorimetric evaluation of the reflectance curve by the CIELAB method (DIN 6174) gives the following values:
Lightness $L = 27.0$
hue gradation; $HGD = 33.3°$
Chroma $C = 20.5$,
which corresponds to a yellowish warm brown shade.

EXAMPLE 2

The procedure described in Example 1 is followed, except that 75 mg of molybdic acid anhydride are added. Yield: 105 g of a flaky reddish blue glistening β-copper phthalocyanine, which has similar properties to those of the product of Example 1. The result of the particle size distribution analysis is shown in Tables 1 and 2. More than 80% of the particles are larger than 20 μm.

When used in a baking finish, the pigment gives a bluish red coating which by reflected light shows an intense bronzy glitter. The reflectance curve of the coating, recorded with light of standard light type D on a spectrograph (Spectronic from Bausch & Lomb, Rochester, N.Y.) shows 7-12% reflectance from about 570 nm onward, with 2 slight maxima at 630 and 720 nm, these maxima being somewhat flatter than those observed on a coating containing the pigment of Example 1 (cf. curve B2 of the Figure).

EXAMPLE 3

The procedure described in Example 1(a) is followed, but the mixture is stirred at 400 rpm, 18 g of methanol are additionally introduced as a solvent, and the temperature of the reaction mixture is kept at 70° C. until the mixture has been saturated with ammonia (which requires about 1 hour). The mixture is then heated as described in Example 1(a), in the course of which the methanol distils off. The temperature in the reaction mixture is set to 190° C. 30 minutes after reaching this temperature, 100 mg of molybdic acid anhydride are added and thereafter the procedure described in Example 1(a) is followed. Yield: 106 g of β-CuPc, in the form of finer flakes than those obtained in Example 1 or 2 (cf. Tables 1 and 2).

In a baking finish, a reddish violet hue, with a suggestion of transparency, and a gentle glitter effect, is obtained. The reflectance curve of the coating, in the visible region of the spectrum, shows a rise at 550 nm, and two flat maxima, with 10% reflectance, at 630 and 720 nm (curve B3 in the Figure).

The colorimetric evaluation by the CIELAB method, DIN 6174, gives $L = 26.5$, $HGD = 16.7°$ and $C = 16.5$, corresponding to a relatively dark red hue, which, however, is lighter and purer than that obtained with the pigments of Examples 4 and 5.

EXAMPLE 4

The procedure described in Example 1 is followed, but 98.2% pure o-phthalodinitrile containing 0.1% of benzonitrile, 0.5% of tolunitrile and 1.2% of isophthalodinitrile and terephthalodinitrile, is used.

Yield: 99 g of β-CuPc, essentially consisting of acicular crystals. According to particle size distribution analysis, fewer than 50% of the particles are larger than 20 μm (cf. Tables 1 and 2).

In a baking finish, dull bluish dark brown colorations are obtained, which no longer glitter by reflected light. The reflectance curve of the coloration is virtually a straight line between 350 and 750 nm, with a reflectance of from 4 to 6%. The colorimetric evaluation by the CIELAB method gives $L = 18.3$, $HGD = 9.5$ and $C = 5.4$, corresponding to a markedly darker and duller hue than those of the colorations with the pigments of Examples 1, 2 and 3 (curve B4 in the Figure).

EXAMPLE 5

For comparison, β-CuPc was prepared by the process described in German Patent No. 1,569,636, Example 4. The particle size distribution was determined on the crude CuPc obtained. The result is shown in Tables 1 and 2. Fewer than 20% of the particles are larger than 20 μm.

In a baking finish, dark blue, high-hiding colorations are obtained. These show no maximum in reflectance between 550 and 750 nm. The CIELAB colorimetric evaluation gives $L = 19$, $HGD = 321°$ and $C = 8.55$, and amounts to the colorimetric description of a dull, dark purple hue (curve B5 in the Figure).

TABLE 1

Particle size distribution in percent by weight, according to wet sieve analysis

| Particle size range [μm] | Example 1 [% by weight] | Example 2 [% by weight] | Example 3 [% by weight] | Example 4 [% by weight] | Example 5 [% by weight] |
| --- | --- | --- | --- | --- | --- |
| 0–10 | 1 | 5 | 32 | 47 | 64 |
| 10–20 | 6 | 9 | 43 | 7 | 14 |
| 20–50 | 26 | 35 | 21 | 19 | 12 |
| 50–100 | 43 | 41 | 3 | 25 | 6 |
| >100 | 24 | 10 | 1 | 2 | 4 |
| Proportion >10 | 99 | 95 | 68 | 53 | 36 |
| Proportion >20 | 93 | 86 | 25 | 46 | 22 |
| Proportion >50 | 67 | 51 | 4 | 27 | 10 |

TABLE 2

Particle size distribution in percent by weight by the diffraction counter analysis method

| Particle size range [μm] | Example 1 [% by weight] | Example 2 [% by weight] | Example 3 [% by weight] | Example 4 [% by weight] | Example 5 [% by weight] |
| --- | --- | --- | --- | --- | --- |
| 0–10 | 2 | 8 | 27 | 35 | 53 |
| 10–20 | 7 | 10 | 35 | 17 | 29 |
| 20–50 | 32 | 41 | 38 | 29 | 16 |
| 50–100 | 45 | 32 | 0 | 16 | 2 |
| >100 | 14 | 9 | 0 | 3 | 0 |
| Proportion >10 | 98 | 92 | 73 | 65 | 47 |
| Proportion >20 | 91 | 82 | 38 | 48 | 18 |
| Proportion >50 | 59 | 51 | 0 | 19 | 2 |

We claim:

1. A copper phthalocyanine pigment in the β-modification, which consists, to the extent of at least 50% by weight, of flakes which are not less than 10 μm long and not less than 3 μm wide, the length:width ratio being not less than 3.3:1, and which has a reflection maximum between 610 and 640 nm and another between 710 and 740 nm.

2. A pigment as claimed in claim 1, which consists, to the extent of at least 70% by weight, of flakes which are not less than 10 μm and not less than 3 μm wide.

* * * * *